UNITED STATES PATENT OFFICE 2,637,742

DIKETONES AND PROCESS FOR THEIR PREPARATION

Earl W. Gluesenkamp, Centerville, and Tracy M. Patrick, Jr., Dayton, Ohio, assignors to Monsanto Chemical Company, St. Louis, Mo., a corporation of Delaware No Drawing. Application September 20, 1950, Serial No. 185,902

14 Claims. (Cl. 260—483)

This invention relates to the novel process of reacting a dialdehyde with 4 to 6 carbon atom ethylenic unsaturated polycarboxylic acids and esters thereof in the presence of a free radical promoting catalyst and to the novel compositions resulting therefrom.

More specifically this invention relates to the discovery that 3 to 12 carbon atom dialdehydes readily react with 4 to 6 carbon atom ethylenic unsaturated polycarboxylic acids selected from the group consisting of maleic, fumaric, citraconic, mesaconic, itaconic, glutaconic, and aconitic acids and esters thereof in the presence of free radical promoting catalysts to provide compositions having utility as plasticizers, oil additives, intermediates, etc.

Examples of the dialdehydes are: malonaldehyde, succinaldehyde, glutaraldehyde, adipaldehyde, pimelaldehyde, suberaldehyde, azelaldehyde, sebacaldehyde, 3-methylglutaraldehyde, 1,4-cyclohexanedialdehyde, 3-phenylglutaraldehyde, and the like. These dialdehydes can be diagrammatically represented by the structural formula

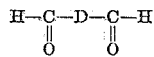

wherein D is a 1 to 10 carbon atom divalent saturated hydrocarbon radical selected from the group consisting of alkylene, cycloalkylene and aralkylene radicals.

Examples of the saturated hydrocarbon radicals of the aforementioned esters are: methyl, ethyl, propyl, butyl, 2-ethylhexyl, dodecyl, octadecyl, phenyl, tolyl, xylyl, mesityl, cumyl, biphenylyl, naphthyl, benzyl, phenethyl, cyclopropyl, cyclohexyl, bicyclohexylyl, tetrahydronaphthyl, decahydronaphthyl, tetrahydroabietyl, dehydroabietyl and the like and mixtures thereof. It is thus apparent that the saturated hydrocarbon radical may contain up to 20 carbon atoms and be selected from the group consisting of alkyl, aralkyl, alkaryl and cycloalkyl radicals. The ester radicals should preferably be selected such that the total number of carbon atoms of the ester radicals does not exceed 48. However higher molecular weight compounds may be prepared.

The term "saturated" as used herein excepts normal benzene ring unsaturation since it is well known that benzene does not give any reaction with bromine water and practically all of its reactions are those of substitution instead of addition.

The compounds of this invention can be diagrammatically represented by the structural formula

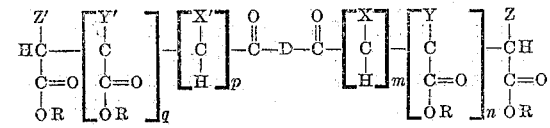

wherein X and X' are selected from the group consisting of —H, —COOR and —CH₂COOR; Y, Z, Y' and Z' are selected from the group consisting of —H and —CH₃; the R radicals are selected from the group consisting of saturated hydrocarbon radicals and mixtures thereof containing up to about 20 carbon atoms and the sum of said carbon atoms from all the saturated hydrocarbon radicals preferably does not exceed 48, said R radicals can also be —H when the carboxy radical is other than attached to the carbon atom adjacent to the carbonyl radical; $m$, $n$, $p$ and $q$ are integers from 0 to 1 and $m$ plus $n$ equals at least one and $p$ plus $q$ equals at least one; and D is a 1 to 10 carbon atom divalent saturated hydrocarbon radical selected from the group consisting of alkylene, cycloalkylene and aralkylene radicals. Whereas mixed esters, that is mixed hydrocarbon radicals and mixed polycarboxylic acid esters, for example methyl ethyl maleate, and diethyl maleate with tributyl aconitate, may be employed, in general it is preferable that the hydrocarbon radicals be identical since it is not economical to preferentially esterify the polycarboxylic acid with mixed alcohols to obtain substantially homogeneous products and preferably only one ester should be employed at a time in order to avoid the formation of a complex mixture of compounds. Further the employment of the symmetrical diesters provides the most desirable reactants when substantially pure compounds are desired, since their use precludes the formation of isomers which may be relatively difficult to separate. The latter reactants yield compounds which can, for example, be represented by the structural formula

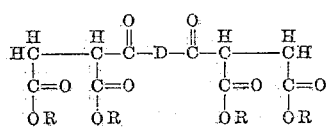

wherein the R radicals are identical saturated hydrocarbon radicals containing up to about 20 carbon atoms; and D is a 1 to 10 carbon atom divalent saturated hydrocarbon radical selected from the group consisting of alkylene, cycloalkylene and aralkylene radicals. Thus, for example, dimethyl, diethyl, dibutyl and di-(2-ethylhexyl) maleates are preferred reactants.

The process of this invention is preferably employed with the substantially completely esterified acids. Whereas the partial esters and the acids are operable the yields obtained when these materials are employed are generally less favorable. Further when an acid or partial ester reacts with the dialdehyde such that a carboxy radical is attached to the carbon atom adjacent to the carbonyl radical, decarboxylation occurs.

The following example is illustrative of this invention.

*Example*

A mixture of 129.0 g. (0.75 mole) diethyl maleate, 25.0 g. (0.25 mole) glutaraldehyde dissolved in 37.5 g. of ether and 1.0 g. of benzoyl peroxide was placed in a jacketed flask. A slow stream of nitrogen gas was bubbled through the mixture and a vacuum was applied to the system to remove the ether. The flask was equipped with a reflux condenser after the removal of the ether and was then heated, the reaction mixture being maintained at about 80° C. by boiling benzene in the flask jacket for about 3 hours after which time an additional 1.0 g. of benzoyl peroxide was added to the mixture. The reaction mixture was then held at about 80° C. for an additional 16 hours. The clear yellow liquid reaction mixture was transferred to a Claisen flask and the excess diethyl maleate recovered by distillation. A light amber viscous liquid residue was obtained which did not distill at 162° C. at 2 mm. and had a refractive index of 1.4652 at 25° C. The yield was found to be 99.3%. The product was identified as tetraethyl glutarylsuccinate.

Calculated for $C_{21}H_{32}O_{10}$: C, 56.75; H, 7.26; O, 35.99. Found: C, 57.07; H, 6.88; O, 36.05.

Other compounds which may be prepared in a similar manner are, for example:

Tetrabutyl glutarylsuccinate
Tetra-(2-ethylhexyl) glutarylsuccinate
Tetraethyl 3-methylglutarylsuccinate
Hexabutyl glutaryltricarballylate.

Other free radical promoting catalysts can be employed in the place of benzoyl peroxide used in the above illustrative example. Additional suitable catalysts are acetyl peroxide, lauroyl peroxide, stearoyl peroxide, hydrogen peroxide, sodium peroxide, sodium perborate, potassium persulfate, and the like. Whereas up to about 5 mole per cent of the free radical promoting catalyst may be employed from about 0.3 to about 2 mole per cent, based on the total reactants, is generally employed.

The temperature at which the reaction is maintained is not critical. The temperature may range from −50° C. to the decomposition point of the reactants but the range of from about 25° C. to about 100° C. is preferred. In general the temperature should be selected such that the free radical promoting catalyst is decomposed at a moderate rate during the course of the reaction, for example, if benzoyl peroxide is the free radical promoting catalyst a temperature in the range of from about 70° C. to about 90° C. is preferred.

The ratio of the reactants may be varied as desired and the excess dialdehyde or lower molecular weight ester removed by suitable means. When higher molecular weight esters are employed the ratio of the reactants should preferably be two of said ester to one or more of the dialdehyde. The higher molecular weight esters are preferably reacted with the dialdehyde in the presence of a suitable inert solvent to facilitate the reaction.

We claim:

1. The process comprising the reaction of (A) a 3 to 12 carbon atom, saturated dialdehyde with (B) a 4 to 6 carbon atom, ethylenic-unsaturated polycarboxylic acid selected from the group consisting of maleic, fumaric, citraconic, mesaconic, itaconic, glutaconic and aconitic acids, esters thereof and mixtures thereof, said ester forming groups being selected from the group consisting of saturated hydrocarbon radicals containing up to 20 carbon atoms, in the presence of (C) a free-radical promoting peroxygen-type catalyst.

2. The process comprising the reaction of a 3 to 12 carbon atom, saturated dialdehyde with a dialkyl maleate, wherein the alkyl radical contains up to 20 carbon atoms, in the presence of a free-radical promoting peroxygen-type catalyst.

3. The process comprising the reaction of (A) glutaraldehyde with (B) diethyl maleate in the presence of (C) benzoyl peroxide.

4. The process comprising the reaction of (A) glutaraldehyde with (B) diethyl maleate in the presence of (C) benzoyl peroxide.

5. The process comprising the reaction of (A) glutaralydehyde with (B) di-(2-ethylhexyl) maleate in the presence of (C) benzoyl peroxide.

6. The process comprising the reaction of (A) 3-methylglutaraldehyde with (B) diethyl maleate in the presence of (C) benzoyl peroxide.

7. The process comprising the reaction of (A) glutaraldehyde with (B) tributyl aconitate in the presence of (C) benzoyl peroxide.

8. Compounds having the formula:

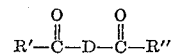

wherein R' and R'' are selected from the group consisting of esters of 1,2-dicarboxyethyl, 1-(1,2-dicarboxypropyl), 2,3-dicarboxypropyl, 1-(1,2,3-tricarboxypropyl), 2-(1,3-dicarboxypropyl), 2-carboxyethyl and 1-(2-carboxypropyl) radicals, wherein the alcohol moiety of said esters are saturated hydrocarbon radicals containing up to 20 carbon atoms and the total number of carbon atoms of said radicals does not exceed 48, and D is a 1 to 10 carbon atom alkylene radical.

9. Compounds having the formula

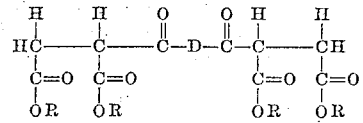

wherein R are identical alkyl radicals and the total number of carbon atoms of said radicals does not exceed 48; and D is a 1 to 10 carbon atom alkylene radical.

10. The compound tetraethyl glutarylsuccinate.
11. The compound tetrabutyl glutarylsuccinate.
12. The compound tetra-(2-ethylhexyl) glutarylsuccinate.
13. The compound tetraethyl 3-methylglutarylsuccinate.
14. The compound hexabutyl glutaryltricarballylate.

EARL W. GLUESENKAMP.
TRACY M. PATRICK, Jr.

References Cited in the file of this patent

Guha, Berichte 72B, 1359–1360 (1939).